(12) United States Patent
Dan et al.

(10) Patent No.: US 12,235,568 B2
(45) Date of Patent: Feb. 25, 2025

(54) LINKAGE APPARATUS, CAMERA MODULE, AND ELECTRONIC DEVICE

(71) Applicant: HUAWEI TECHNOLOGIES CO., LTD., Shenzhen (CN)

(72) Inventors: Jiapeng Dan, Dongguan (CN); Li-Te Kuo, Dongguan (CN); Lei Lu, Dongguan (CN); Xin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 18/148,925

(22) Filed: Dec. 30, 2022

(65) Prior Publication Data

US 2023/0137118 A1    May 4, 2023

Related U.S. Application Data

(63) Continuation of application No. PCT/CN2021/100207, filed on Jun. 15, 2021.

(30) Foreign Application Priority Data

Jul. 1, 2020 (CN) .......................... 202010638092.1

(51) Int. Cl.
| | | |
|---|---|---|
| *G03B 17/56* | (2021.01) | |
| *G03B 13/18* | (2021.01) | |
| *G03B 17/02* | (2021.01) | |
| *H04N 23/55* | (2023.01) | |
| *H04N 23/69* | (2023.01) | |

(52) U.S. Cl.
CPC .......... *G03B 17/561* (2013.01); *G03B 13/18* (2013.01); *G03B 17/02* (2013.01); *H04N 23/55* (2023.01); *H04N 23/69* (2023.01)

(58) Field of Classification Search
CPC .................................................. G03B 2205/53
See application file for complete search history.

(56) References Cited

U.S. PATENT DOCUMENTS

2006/0209434 A1    9/2006   Baik et al.

FOREIGN PATENT DOCUMENTS

| JP | 2001183570 A | 7/2001 |
| KR | 20190128279 A | 11/2019 |
| KR | 20190136083 A | 12/2019 |

(Continued)

*Primary Examiner* — Minh Q Phan
(74) *Attorney, Agent, or Firm* — Leydig, Voit & Mayer, Ltd.

(57) ABSTRACT

This application discloses a linkage apparatus, a camera module, and an electronic device. The linkage apparatus is used in the camera module with continuous zooming, and includes a base, and a first carrier and a second carrier that are slidably connected to the base. A first positioning element is disposed on the base, a first sensing element and a second positioning element are disposed on the first carrier, and a second sensing element is disposed on the second carrier. The first sensing element is disposed opposite to the first positioning element, to detect a location of the first carrier relative to the base. The second sensing element is disposed opposite to the second positioning element, to detect a location of the second carrier relative to the first carrier. A movement relationship between the first carrier and the second carrier is set as an associated movement.

20 Claims, 6 Drawing Sheets

(56) References Cited

FOREIGN PATENT DOCUMENTS

| WO | 2018012531 A1 | 1/2018 | | |
|---|---|---|---|---|
| WO | 2019151700 A1 | 8/2019 | | |
| WO | WO-2019216676 A1 * | 11/2019 | ............. | G01D 5/145 |

* cited by examiner

LINKAGE APPARATUS, CAMERA MODULE, AND ELECTRONIC DEVICE

CROSS-REFERENCE TO RELATED APPLICATIONS

This application is a continuation of International Application No. PCT/CN2021/100207, filed on Jun. 15, 2021, which claims priority to Chinese Patent Application No. 202010638092.1, filed on Jul. 1, 2020. The disclosures of the aforementioned applications are hereby incorporated by reference in their entireties.

TECHNICAL FIELD

This application relates to the field of camera module technologies, and in particular, to a linkage apparatus, a camera module, and an electronic device.

BACKGROUND

In recent years, implementing an optical zooming function at a specific power on a camera module of a mobile phone has been more likely to attract consumers. To implement optical zooming at some fixed powers, a lens reaches specified locations as a carrier moves, to implement zooming and focusing.

However, location control precision of a carrier in a common camera module is low. A lens located on the carrier implements zooming at some specific powers, but cannot implement continuous zooming. Consequently, actual imaging effect of the camera module is poor.

SUMMARY

In an embodiment this application provides a linkage apparatus, a camera module, and an electronic device, to resolve a problem that a common camera module cannot implement continuous zooming.

To resolve the foregoing technical problem, this application provides a linkage apparatus. The linkage apparatus is used in a camera module with continuous zooming and includes a base, and a first carrier and a second carrier that are slidably connected to the base. A first positioning element is disposed on the base, a first sensing element and a second positioning element are disposed on the first carrier, and a second sensing element is disposed on the second carrier. The first sensing element is disposed opposite to the first positioning element, to detect a location of the first carrier relative to the base. The second sensing element is disposed opposite to the second positioning element, to detect a location of the second carrier relative to the first carrier. Based on this, the relative location of the second carrier is detected by using the first carrier as a reference. When the first carrier used as a reference moves, a relative location relationship between the second carrier and the first carrier changes. This change can be obtained through cooperation between the second sensing element and the second positioning element. Correspondingly, the second carrier can quickly respond to a movement of the first carrier to implement a synchronous movement, thereby improving location control precision of the second carrier. For example, the first carrier is in a location A, and the second carrier is in a location B (the two locations are usually close to each other). Now, the first carrier needs to move to a location C, and the second carrier needs to move to a location D to complete zooming and focusing at a specific power. Because an existing sensing element and an existing positioning element are affected by factors such as manufacturing and a process level, high-precision control cannot be implemented for a long distance. Consequently, when a carrier moves at a long distance, control precision is low. For example, the first carrier usually cannot accurately move to the location C but move to a location near C. Similarly, affected by the control precision, the second carrier is usually near the location D. In this case, eventually, both the first carrier and the second carrier have errors, leading to a larger error in a focusing distance (D-C) between the first carrier and the second carrier. In addition, the focusing distance is a highly essential factor that affects imaging effect. Consequently, actual imaging effect of the camera module is poor. However, according to the linkage apparatus provided in this application, when the first carrier moves from the location A to the location C, the relative location relationship between the second carrier and the first carrier changes on a basis that a movement relationship between the first carrier and the second carrier is set to be a linkage. This change is obtained through cooperation between the second sensing element and the second positioning element. Therefore, the second carrier can quickly respond to the movement of the first carrier to synchronously move from the location B to the location D. Further, through the cooperation between the second sensing element and the second positioning element, the second carrier cooperates with a related control circuit and/or control chip to detect the relative location relationship between the second carrier and the first carrier again, thereby forming a closed-loop detection system. It can be understood that, in a process in which the first carrier moves from the location A to the location C, each movement can be controlled by using a specific short step. A distance of this step is much shorter than a distance from A to C. As the existing sensing element and the existing positioning element have very high control precision for a short distance, the second carrier can follow the first carrier to reach the location C at high precision. Then, the second carrier further moves another distance to reach the location D. In this way, an error of the focusing distance in this application is mainly caused by the movement of the second carrier from C to D. Compared with an existing solution, in this application, a distance affected by the error is shorter (in this application, the second carrier encounters an error only in a D-C segment, whereas in the conventional technology, the second carrier encounters an error in a D-B segment, and the first carrier also encounters an error in a C-A segment), and fewer factors are affected by the error (only the movement of the second carrier encounters an error, whereas in the conventional technology, both the first carrier and the second carrier need to move and encounter errors). In this way, a final error of the focusing distance is smaller, higher-precision zooming and focusing at a specific power can be implemented, and imaging effect is improved.

In some embodiments, the first carrier includes a first carrying portion and a first extending portion, the first extending portion is located at an end of the first carrying portion that faces the base, and the first sensing element is disposed on the first extending portion. Based on this, cooperation between the first sensing element and the first positioning element on the base can be facilitated, to obtain location information related to the first carrier.

In some embodiments, in a process of sliding the first carrier relative to the base, the first sensing element and the first positioning element are kept directly opposite to each other, to ensure that the first sensing element can cooperate with the first positioning element to obtain location information of the first carrier relative to the base.

In some embodiments, the first carrier further includes a second extending portion, the second extending portion is located at an end of the first carrying portion that faces the second carrier, and the second positioning element is disposed on the second extending portion. Based on this, cooperation between the second positioning element and the second sensing element on the second carrier can be facilitated, to obtain location information related to the second carrier.

In some embodiments, the second carrier includes a second carrying portion and a first protruding portion, the first protruding portion is located on a side of the second carrying portion, and the second sensing element is disposed on the first protruding portion. Therefore, the second sensing element on the first protruding portion can ensure cooperation with the second positioning element on the second extending portion, to obtain the location information of the second carrier.

In some embodiments, a first limiting block is disposed at an end of the second extending portion that is away from the first carrying portion, and the first protruding portion is located between the first limiting block and the first carrying portion. Therefore, a distance between the second sensing element and the second positioning element does not exceed a maximum sensing distance, to reduce a possibility that the first protruding portion deviates from the second extending portion in some extreme cases (such as a drop or a violent shake). It should be understood that, when the second carrier is about to move away from the first carrier, a manner in which the first limiting block abuts against the first protruding portion can ensure that the first protruding portion is located within in a length range of the second extending portion. Correspondingly, the second sensing element on the first protruding portion can still cooperate with the second positioning element on the second extending portion to detect the location of the second carrier relative to the first carrier.

In some embodiments, the first carrier further includes a second protruding portion, the second protruding portion is located on a side of the first carrying portion, and the second positioning element is disposed on the second protruding portion.

In some embodiments, the second carrier includes a second carrying portion and a third extending portion, the third extending portion is located at an end of the second carrying portion that faces the first carrier, and the second sensing element is disposed on the third extending portion. Therefore, the second sensing element on the second protruding portion can ensure cooperation with the second positioning element on the third extending portion, to obtain location information of the second carrier.

In some embodiments, a second limiting block is disposed at an end of the third extending portion that is away from the second carrying portion, and the second protruding portion is located between the second limiting block and the second carrying portion. It should be understood that, when the second carrier is about to move away from the first carrier, a manner in which the second limiting block abuts against the second protruding portion can ensure that the second protruding portion is located within a length range of the third extending portion. Correspondingly, the second sensing element on the second protruding portion can still cooperate with the second positioning element on the third extending portion to detect the location of the second carrier relative to the first carrier.

In some embodiments, in a process of sliding the second carrier relative to the base, the second sensing element and the second positioning element are kept directly opposite to each other, to ensure that the second sensing element can cooperate with the second positioning element to obtain location information of the second carrier relative to the first carrier.

In some embodiments, the first sensing element is configured to generate a first sensing signal, and the first sensing signal includes location information of the first carrier relative to the base. The first sensing signal includes the location information of the first carrier relative to the base. Based on the first sensing signal, the related control circuit can better determine a relative distance between the base and the first carrier, to improve location control precision of the first carrier.

In some embodiments, the second sensing element is configured to generate a second sensing signal, and the second sensing signal includes the location information of the second carrier relative to the first carrier. The second sensing signal includes the location information of the second carrier relative to the first carrier. Based on the second sensing signal, the related control circuit can better determine a relative distance between the second carrier and the first carrier, to improve location control precision of the second carrier.

In some implementations, the first positioning element is configured to generate a first sensing signal, and the first sensing signal includes location information of the first carrier relative to the base. The first sensing signal includes the location information of the first carrier relative to the base. Based on the first sensing signal, the related control circuit can better determine a relative distance between the base and the first carrier, to improve location control precision of the first carrier.

In some embodiments, the second positioning element is configured to generate a second sensing signal, and the second sensing signal includes the location information of the second carrier relative to the first carrier. The second sensing signal includes the location information of the second carrier relative to the first carrier. Based on the second sensing signal, the related control circuit can better determine a relative distance between the second carrier and the first carrier, to improve location control precision of the second carrier.

In some embodiments, the first carrier is configured to carry a first lens assembly for implementing zooming, and the second carrier is configured to carry a second lens assembly for implementing focusing.

In some embodiments, when the linkage apparatus works, the first lens assembly moves first, and the second lens assembly moves by following the first lens assembly. After the first lens assembly and the second lens assembly move to predetermined locations, zooming is first implemented by adjusting the first lens assembly, and then focusing is implemented by adjusting the second lens assembly. It should be understood that, based on cooperation between the first carrier and the second carrier, a relative location relationship between the first lens assembly and the second lens assembly can be accurately learned, to improve imaging effect of the camera module that uses the linkage apparatus.

In some embodiments, both the first positioning element and the second positioning element are strip-shaped magnets, and both the first sensing element and the second sensing element are Hall sensors. Alternatively, both the first positioning element and the second positioning element are Hall sensors, and both the first sensing element and the second sensing element are strip-shaped magnets. These strip-shaped magnets can help cooperate with corresponding Hall sensors to implement location detection.

This application further provides a camera module, including a first lens assembly, a second lens assembly, and the linkage apparatus in the foregoing embodiments. The first lens assembly is disposed on the first carrier, and the second lens assembly is disposed on the second carrier.

In some embodiments, the camera module further includes a control circuit. The control circuit is configured to correspondingly control a movement of the first carrier based on a first sensing signal of the first sensing element or the first positioning element. It should be understood that, for example, the first lens assembly is a lens assembly with continuous zooming. Because a location of the first carrier is determined, a location of the first lens assembly can be synchronously determined, to help control the location of the first lens assembly to implement zooming at a specific power.

In some embodiments, the control circuit is further configured to correspondingly control a movement of the second carrier based on the first sensing signal and a second sensing signal of the second sensing element. Alternatively, the control circuit is further configured to correspondingly control a movement of the second carrier based on the first sensing signal and a second sensing signal of the second positioning element. It should be understood that, for example, the second lens assembly is a lens assembly with focusing. Because a location of the second carrier is determined, a location of the second lens assembly can be synchronously determined, to control the location of the second lens assembly to implement focusing.

In some embodiments, when the camera module works, the first lens assembly moves first, and the second lens assembly moves by following the first lens assembly. After the first lens assembly and the second lens assembly move to predetermined locations, zooming is first implemented by adjusting the first lens assembly, and then focusing is implemented by adjusting the second lens assembly. It should be understood that, based on cooperation between the first carrier and the second carrier, a relative location relationship between the first lens assembly and the second lens assembly can be accurately learned, to improve imaging effect of the camera module that uses the linkage apparatus.

This application further provides an electronic device, including the camera module in the foregoing embodiments. The electronic device may include a mobile phone, a tablet computer, a notebook computer, a vehicle-mounted monitor, a display, or another device.

In this application, a movement relationship between the first carrier and the second carrier is set as an associated movement. When the first carrier moves, the second carrier can correspondingly move in response to a movement of the first carrier, to improve location control precision of the first carrier and the second carrier.

DESCRIPTION OF EMBODIMENTS

Figure 1:
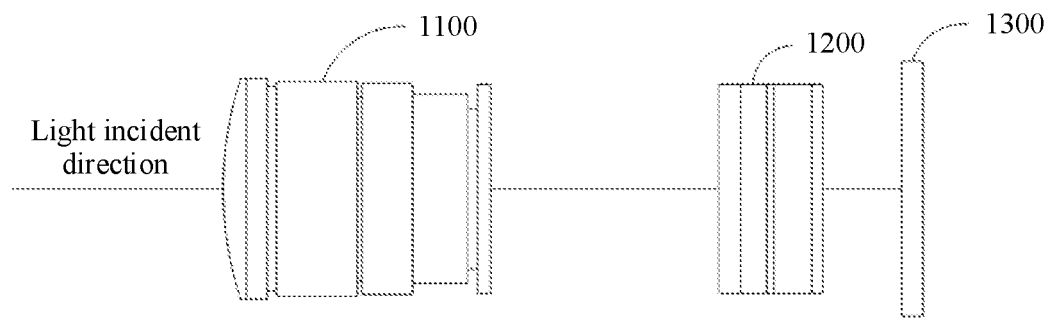
FIG. 1 is a schematic diagram of a first lens assembly, a second lens assembly, and an image sensor according to an embodiment of this application.

The following clearly describes the technical solutions in embodiments of this application with reference to the accompanying drawings in embodiments of this application.

A common camera module with optical zooming includes at least two moveable lens groups. One of the moveable lens groups is configured to implement a movement, in a specific range, of a lens assembly with zooming at some fixed powers, so as to implement zooming by changing a relative location; and the other of the moveable lens groups is configured to implement a movement, in a specific range, of a lens assembly with focusing, so as to implement focusing. For this purpose, a voice coil actuator is further provided in the common camera module, so that a thrust force provided by the voice coil actuator is used to drive a corresponding carrier to move. Synchronously, a movement of the carrier can synchronously drive a lens assembly on the carrier to move, so as to enable the lens assembly with zooming to reach a predetermined location.

The lens assembly with zooming should be carried on the carrier. Correspondingly, a relative location of the lens assembly is also determined based on a relative location of the carrier. That is, location precision of the carrier is closely associated with zooming precision of the corresponding lens assembly. It should be understood that, in the camera module, the lens assembly for implementing zooming at a fixed power has a high requirement on movement precision of the carrier. However, in an actual use process, for the common camera module, due to limitations of a structural design of a motor movement system, a motor movement detection and control system, and the like, control and location feedback of the carriers are not performed in time, and detection precision of these carriers is low.

Based on this, when the common camera module needs to implement zooming at some fixed powers, a location to which a motor carrier actually moves deviates from a predetermined location. Synchronously, an actual location of a lens assembly on the motor carrier also deviates from a predetermined location. Impact of such a location deviation is prominent in the zooming field. This affects, to a specific extent, user experience of an electronic device that uses the camera module.

For example, a first carrier is in a location A and a second carrier is in a location B. Now, the first carrier needs to move to a location C, and the second carrier needs to move to a location D to complete zooming and focusing at a power of 3×. However, a positioning element and a sensing element are affected by factors such as a manufacturing process and a material, and a movement of a related carrier cannot be well controlled, that is, location control precision of these carriers is low. Consequently, the first carrier may move to a location C+ or a location C−, and the second carrier may move to a location D+ or a location D−.

It should be understood that the location C+ and the location C− are different from the location C, and the location D+ and the location D− are also different from the location D. In this case, a problem such as defocus or blur may easily occur in images produced by the common camera module. Imaging effect of the camera module is poor, and user acceptance of these images is low.

Based on the foregoing problems, with reference to all of FIG. 1 to FIG. 7, embodiments of this application provide a linkage apparatus used in a camera module, the camera module, and an electronic device. A linkage apparatus 100 may carry related lens assemblies (1100 and 1200) to cooperate with these lens assemblies to implement zooming and focusing, so as to further implement a continuous optical zooming function.

When an electronic device that uses the camera module performs photographing, the linkage apparatus in the camera module may drive the related lens assemblies to move, so as to precisely enable these lens assemblies to move to predetermined locations. Therefore, the camera module can implement zooming and focusing at specific power, to improve photographing experience of a user.

To facilitate understanding of the technical solutions in the embodiments of this application, in each embodiment, description is provided by using an example in which the first carrier is mainly used as a carrier for carrying a first lens assembly with zooming, the second carrier is used as a carrier for carrying a second lens assembly with focusing, and a widely used mobile phone is used as an electronic device. However, it should also be understood that the first carrier and the second carrier each may carry another type of lens assembly based on a requirement. The electronic device may also refer to a tablet computer, a notebook computer, a vehicle-mounted monitor, a display, or another device. This is not limited in this application.

Figure 2:
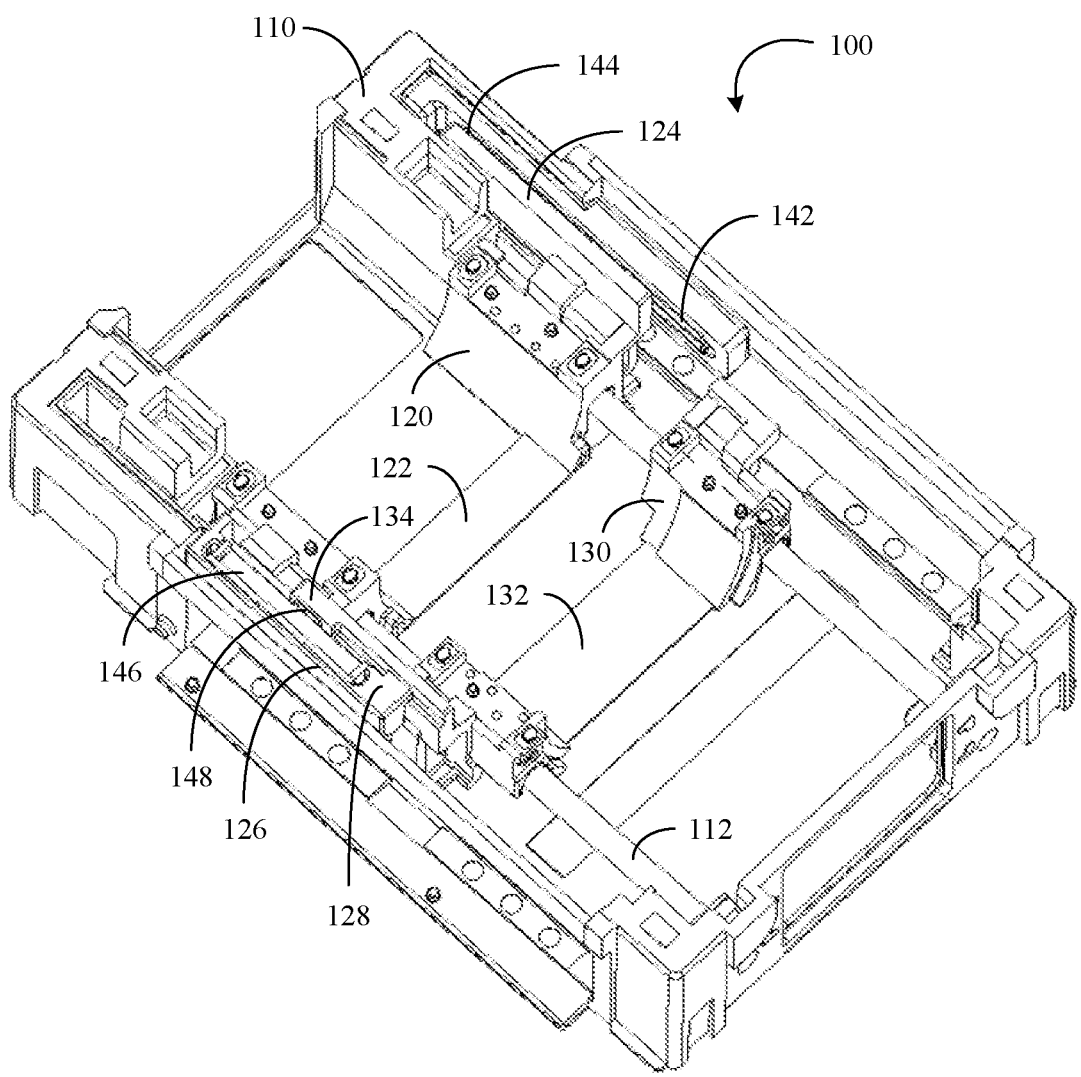
FIG. 2 is a three-dimensional diagram of a linkage apparatus according to an embodiment of this application.
Figure 3:
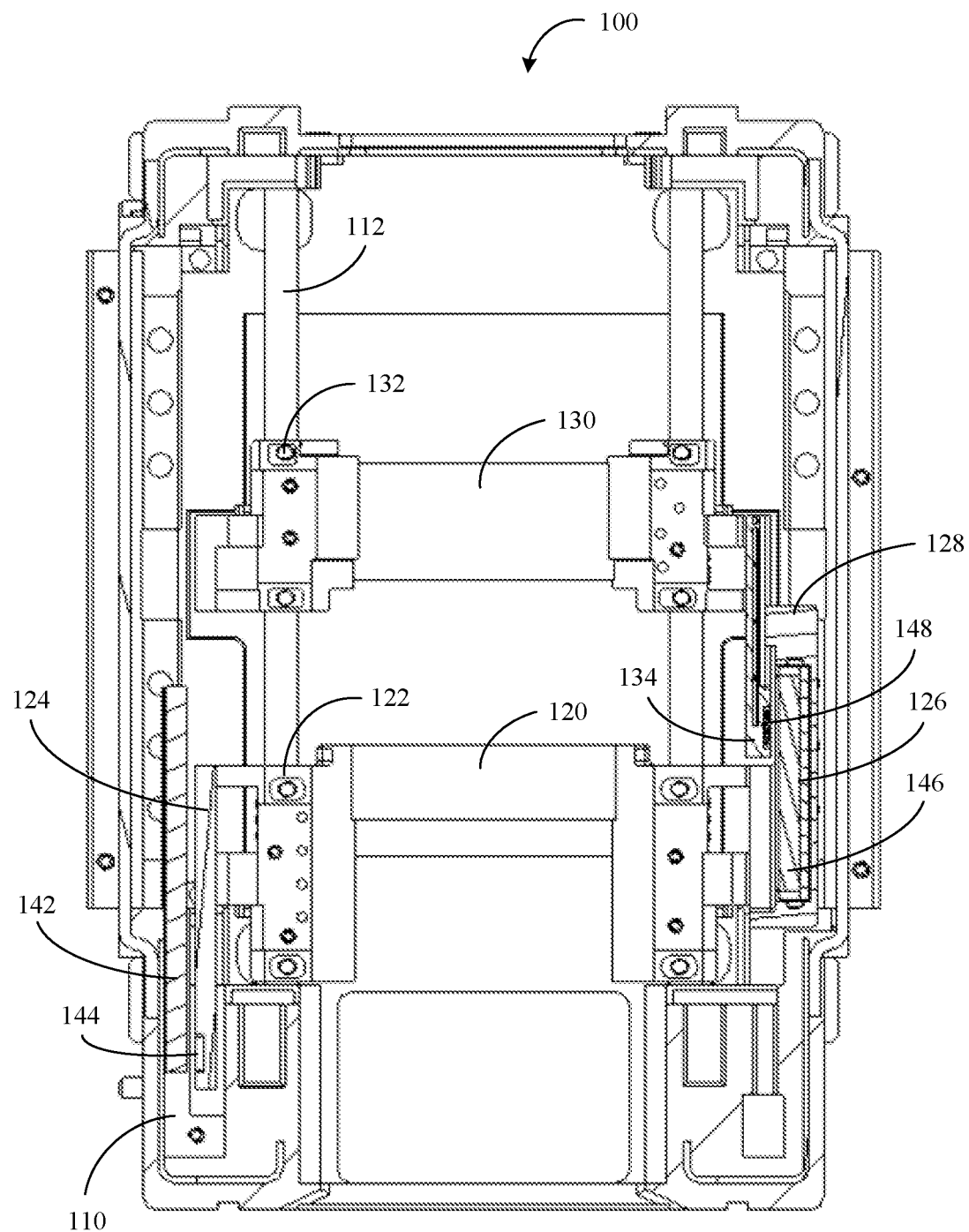
FIG. 3 is a cutaway drawing of the linkage apparatus in FIG. 2.

FIG. 1 is a schematic diagram of a first lens assembly, a second lens assembly, and an image sensor. FIG. 2 is a three-dimensional diagram of a linkage apparatus. FIG. 3 is a cutaway drawing of a linkage apparatus. With reference to all of FIG. 1 to FIG. 3, an embodiment of this application provides a linkage apparatus 100, including a base 110, a first carrier 120, and a second carrier 130. The base 110 has a sliding shaft 112, and the sliding shaft 112 may sequentially pass through the first carrier 120 and the second carrier 130. As shown in FIG. 2 and FIG. 3, for example, there are two sliding shafts 112, so that the first carrier 120 and the second carrier 130 slide stably. It should be understood that a quantity of the sliding shafts 112 may be adjusted based on a requirement, and there may be one, three, or another quantity of sliding shafts 112.

Correspondingly, both the first carrier 120 and the second carrier 130 can be slidably connected to the base 110, and their respective movement directions are limited by the sliding shafts 112 of the base 110. Based on this, the first carrier 120 and the second carrier 130 may move along a length direction of the sliding shaft 112 when driven by a corresponding motor, so as to change their respective relative locations. Based on a movement of the first carrier 120, the first lens assembly 1100 may be synchronously driven to move. Based on a movement of the second carrier 130, the second lens assembly 1200 may be synchronously driven to move. In this way, the first lens assembly 1100 and the second lens assembly 1200 cooperate with each other to implement zooming and focusing at different powers.

To improve location control precision of the first carrier 120 and the second carrier 130 in the embodiments of this application, movements of the first carrier 120 and the second carrier 130 are set to associated movements. That is, the movement of the second carrier 130 is associated with the movement of the first carrier 120. When the first carrier 120 moves, the second carrier 130 also correspondingly moves in response to the movement of the first carrier 120, thereby improving the location control precision of the first carrier 120 and the second carrier 130.

Based on the concept of associated movement, precision of location control by the first carrier 120 and the second carrier 130 can be improved. Therefore, the first lens assembly 1100 on the first carrier 120 can precisely move to a predetermined location, to implement zooming at a specific power. The second lens assembly 1200 of the second carrier 130 can also quickly respond and precisely move to a predetermined location, to implement focusing.

It should be understood that, when the first carrier 120 and the second carrier 130 move in association, respective speeds of the first carrier 120 and the second carrier 130 can be adjusted based on a usage requirement. That is, movement speeds of the first carrier 120 and the second carrier 130 may be different, and it should not be understood that the movement speeds of the first carrier 120 and the second carrier 130 are unnecessarily the same.

Figure 4:
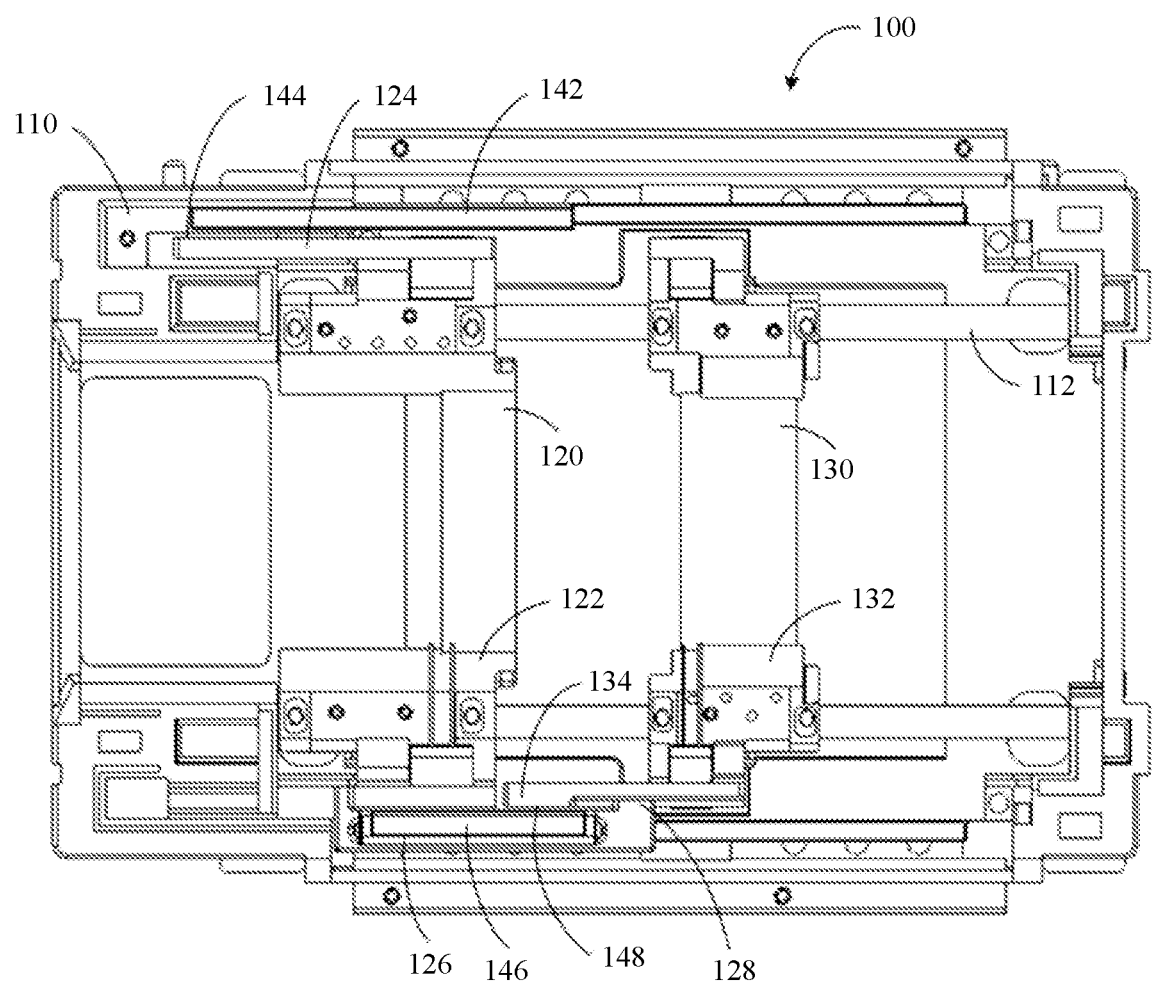
FIG. 4 is a top view of the linkage apparatus in FIG. 2.
Figure 5:
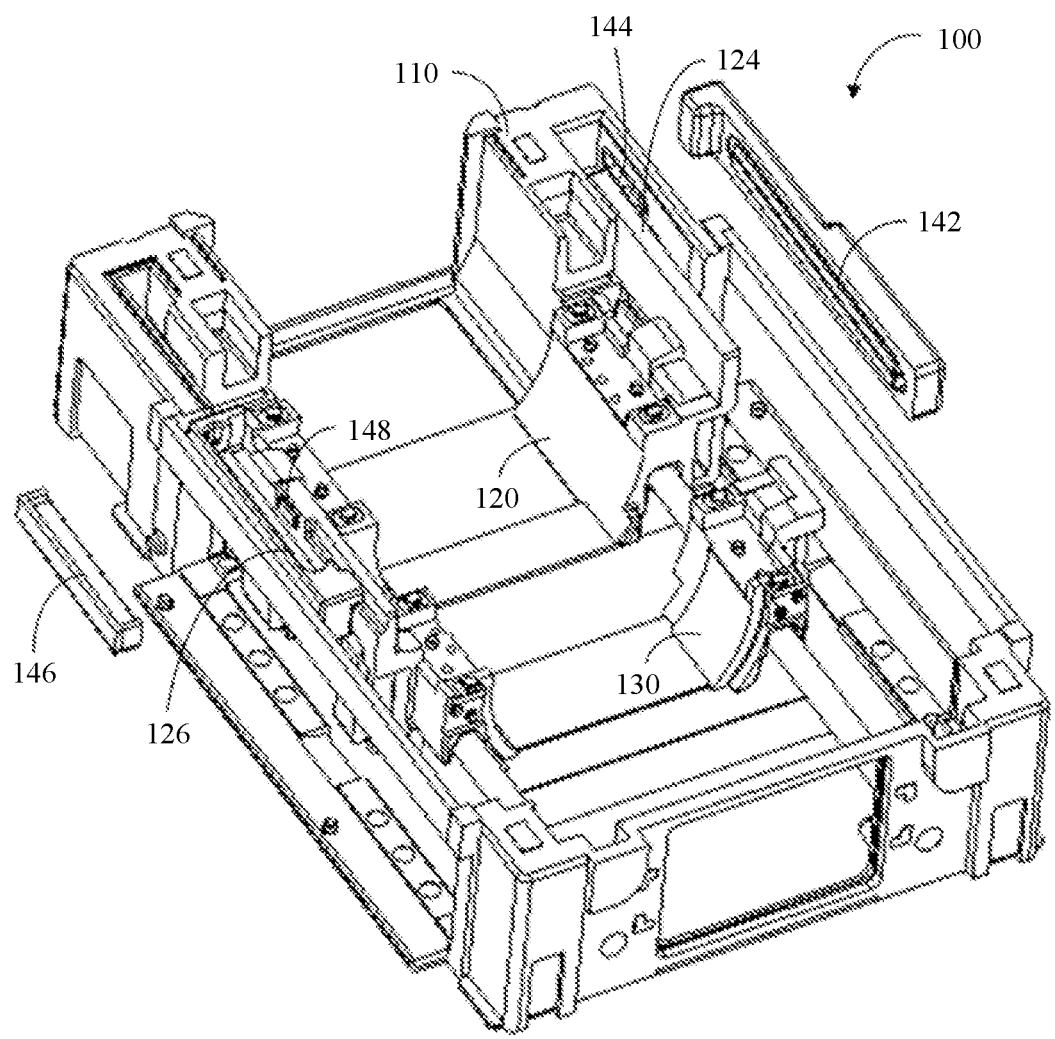
FIG. 5 is a schematic exploded view of a linkage apparatus according to an embodiment of this application.

FIG. 4 is a top view of a linkage apparatus. FIG. 5 is a schematic exploded view of a linkage apparatus. With reference to all of FIG. 2, FIG. 3, FIG. 4, and FIG. 5, in some embodiments, the first carrier 120 includes a first carrying portion 122 and a first extending portion 124. The first carrying portion 122 may carry the first lens assembly 1100, to drive the first lens assembly to move. The first carrying portion 122 further has a through hole (not shown in the figure) corresponding to the sliding shaft 112. The through hole of the first carrying portion 122 may be available for the sliding shaft 112 to pass through, so that the first carrier 120 can slide by using the sliding shaft 112. Therefore, when the first carrying portion 122 is driven by a corresponding motor to move along the sliding shaft 112, the first carrying portion 122 can synchronously drive the first lens assembly to move, so as to change a location of the first lens assembly. By changing the location, the first lens assembly can implement zooming at a specific power.

To determine a location of the first carrying portion 122 to synchronously determine the location of the first lens assembly, a location association between the first carrier 120 and the base 110 is established in each embodiment. To be specific, a relative location of the first carrier 120 is determined by using the base 110 as a reference. For this reason, a first positioning element 142 is disposed on the base 110, and a first sensing element 144 corresponding to the first positioning element 142 is disposed on the first extending portion 124 of the first carrier 120.

In some embodiments, for example, the first sensing element 144 denoted in the accompanying drawings such as FIG. 2, FIG. 4, and FIG. 5 is actually located on a side of the first extending portion 124 and faces the first positioning element 142. This may be understood with reference to the cutaway drawing of FIG. 3.

Figure 6:
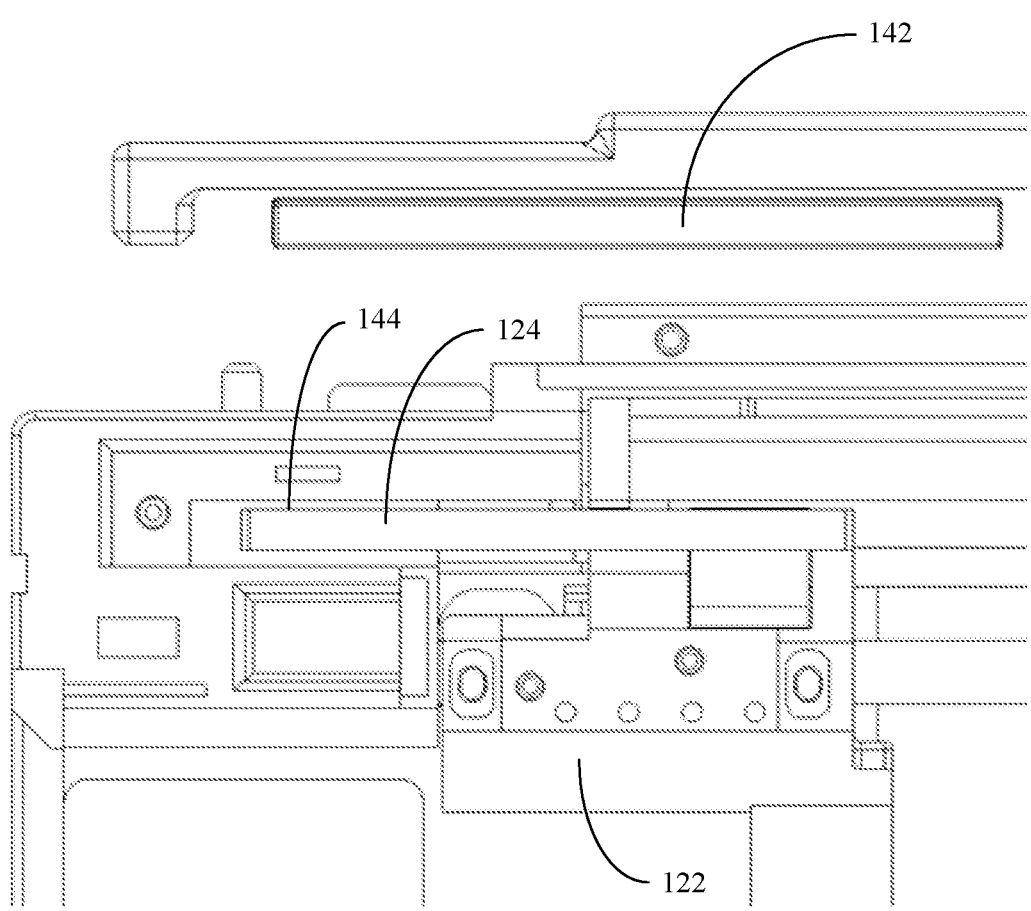
FIG. 6 is a partial schematic diagram of a linkage apparatus according to an embodiment of this application.

FIG. 6 is a partial schematic diagram of a linkage apparatus. As shown in FIG. 2 to FIG. 6, the first extending portion 124 is located on a side of the first carrying portion 122, and extends in a direction towards the base 110. Based on an extension structure of the first extending portion 124, when the first carrying portion 122 slides on the sliding shaft 112, the first sensing element 144 on the first extending portion 124 can always maintain a sensing relationship with the first positioning element 142 on the base 110, to determine the relative location of the first carrier 120 through cooperation between the first sensing element 144 and the first positioning element 142. In addition, because the location of the first carrier 120 is determined, the location of the first lens assembly can be synchronously determined, to help control the location of the first lens assembly to implement zooming at a specific power.

In some embodiments, the first positioning element 142 is disposed opposite to the first sensing element 144. In a movement process of the first carrier 120, the first positioning element 142 and the first sensing element 144 can always maintain a relationship of being directly opposite to each other, so as to cooperate to obtain location information of the first carrier 120. Alternatively, in some cases, the first positioning element 142 and the first sensing element 144 may be staggered at a distance, but the first positioning element 142 and the first sensing element 144 can still cooperate to obtain the location information of the first carrier 120.

With reference to all of FIG. 2 to FIG. 5, in some embodiments, the second carrier 130 includes a second carrying portion 132. The second carrying portion 132 may carry the second lens assembly, to drive the second lens assembly to move. Similarly, the second carrying portion 132 also has a through hole (not shown in the figure) corresponding to the sliding shaft 112. The through hole of the second carrying portion 132 may be available for the sliding shaft 112 to pass through, so that the second carrier 130 can slide by using the sliding shaft 112. Therefore, when the second carrying portion 132 is driven by a corresponding motor to move along the sliding shaft 112, the second carrying portion 132 can synchronously drive the second lens assembly to move, so as to change a location of the second lens assembly. By changing the location, the second lens assembly can implement a focusing function.

To determine a location of the second carrying portion 132 to synchronously determine the location of the second lens assembly, the linkage apparatus 100 in each embodiment is implemented by establishing an associated location relationship between the second carrier 130 and the first carrier 120. To be specific, a relative location of the second carrier 130 is correspondingly determined by using the first carrier 120 as a dynamic reference. For this reason, a second positioning element 146 is further disposed on the first carrier 120, and a second sensing element 148 corresponding to the second positioning element 146 is disposed on the second carrier 130. The relative location of the second carrier 130 is determined through cooperation between the second sensing element 148 and the second positioning element 146. In addition, because the location of the second carrier 130 is determined, the location of the second lens assembly can be synchronously determined, to help control the location of the second lens assembly to implement focusing.

For example, the linkage apparatus 100 in each embodiment is applied to a mobile phone. When the linkage apparatus 100 is used in a mobile phone, based on a focal length that is of a specific power and that is selected by a user, the first carrier 120 drives the first lens assembly to move, and the second carrier 130 also drives the second lens assembly to move, so as to implement zooming and focusing at the specific power.

In some embodiments, the second positioning element 146 is disposed opposite to the second sensing element 148. In a movement process of the first carrier 120 and the second carrier 130, the second positioning element 146 and the second sensing element 148 can always maintain a relationship of being directly opposite to each other, to cooperate to obtain location information of the second carrier 130. Alternatively, in some cases, the second positioning element 146 and the second sensing element 148 may be staggered at a distance, but the second positioning element 146 and the second sensing element 148 can still cooperate to obtain the location information of the second carrier 130.

It should be understood that the relative location of the second carrier 130 is detected by using the first carrier 120 as a reference. When the first carrier 120 used as a reference moves, a relative location relationship between the second carrier 130 and the first carrier 120 changes. This change can be obtained through cooperation between the second sensing element 148 and the second positioning element 146. Correspondingly, through adjustment of a driving force direction and an action time of a motor that drives the second carrier 130 to move, the second carrier 130 can quickly respond to the movement of the first carrier 120 to implement synchronous movement. Then, a location of the second carrier 130 relative to the first carrier 120 can be detected again through cooperation between the second sensing element 148 and the second positioning element 146, thereby forming a closed-loop detection system. The relative location relationship between the second carrier 130 and the first carrier 120 can be precisely controlled based on a plurality of times of closed-loop detection, to drive the second carrier 130 to move more precisely to a predetermined location, thereby improving the location control precision of the second carrier 130.

After the first carrier 120 carrying the first lens assembly and the second carrier 130 carrying the second lens assembly each reach a predetermined location, a zooming operation is first completed by adjusting the first lens assembly on the first carrier 120. Then, the second carrier 130 slightly moves by adjusting the second carrier 130, so that the second lens assembly on the second carrier 130 completes a focusing operation. Based on this, the mobile phone that uses the linkage apparatus 100 can precisely implement the zooming operation and the focusing operation, so that the user obtains a photo at a required power and photographing experience of the user is improved.

In some embodiments, the first sensing element 144 correspondingly generates a first sensing signal based on sensing of the first positioning element 142. The first sensing signal includes location information of the first carrier 120 relative to the base 110. The second sensing element 148 correspondingly generates a second sensing signal based on sensing of the second positioning element 146. The second sensing signal includes the location information of the second carrier 130 relative to the first carrier 120.

The first sensing signal and the second sensing signal may be transmitted to a control circuit of the camera module. Correspondingly, the control circuit may obtain the location information of the first carrier 120 based on the first sensing signal, and obtain the location information of the second carrier 130 based on the second sensing signal. In addition, the location information of the second carrier 130 in the second sensing signal is determined based on the first carrier 120. Based on this, the control circuit can better determine relative distances of the base 110, the first carrier 120, and the second carrier 130 based on the first sensing signal and the second sensing signal, to improve the location control precision of the first carrier 120 and the second carrier 130, and more precisely control the two carriers to move.

Figure 7:
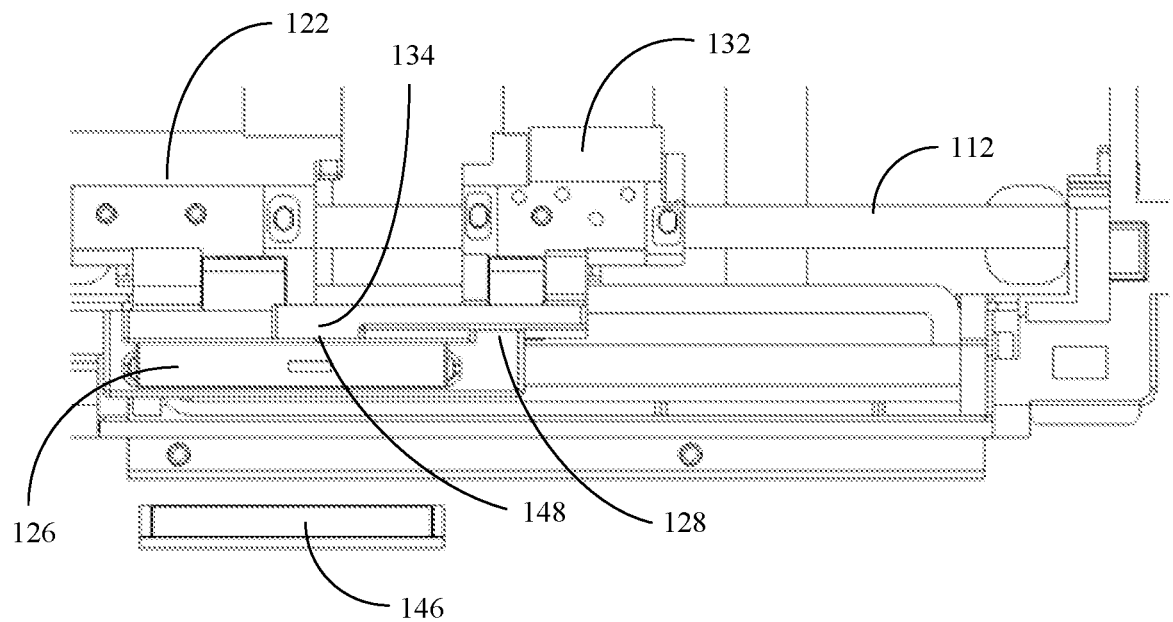
FIG. 7 is a partial schematic diagram of a linkage apparatus from another perspective according to an embodiment of this application.

FIG. 7 is a partial schematic diagram of a linkage apparatus from another perspective. With reference to all of FIG. 2, FIG. 3, FIG. 4, FIG. 5, and FIG. 7, in some embodiments, to implement an associated movement between the second carrier 130 and the first carrier 120, the first carrier 120 further includes a second extending portion 126. Corresponding to the first extending portion 124, the second extending portion 126 is also located on a side of the first carrying portion 122. However, different from the first extending portion 124, the second extending portion 126 extends in a direction towards the second carrier 130. A second positioning element 146 corresponding to the second sensing element 148 is disposed on the second extending portion 126. In addition to the second carrying portion 132, the second carrier 130 further includes a first protruding portion 134. The first protruding portion 134 is located on a side of the second carrying portion 132, and the second sensing element 148 is disposed on the first protruding portion 134. It should be understood that, relative to the sliding shaft 112, the second extending portion 126 and the first protruding portion 134 are located on a same side, so that the second sensing element 148 on the first protruding portion 134 can cooperate with the second positioning element 146 on the second extending portion 126.

In some embodiments, the second sensing element 148 denoted in the accompanying drawings such as FIG. 4 and FIG. 7 is actually located on a side of the first protruding portion 134 and faces the second positioning element 146. This may be understood with reference to accompanying drawings such as the cutaway drawing of FIG. 3 and the exploded view of FIG. 5.

In some embodiments, along the length direction of the sliding shaft 112, a length of the second extending portion 126 is greater than a length of the first protruding portion 134. Based on this, in a process in which the first carrier 120 and the second carrier 130 move in association, the second sensing element 148 on the first protruding portion 134 can always maintain a sensing relationship with the second positioning element 146, to detect the relative location of the second carrier 130 by using the second positioning element 146.

In some embodiments, to facilitate understanding of a location relationship of a related structure of the first carrier 120, the following provides description by using an example in which the first carrying portion 122 includes a first end, a second end, a first side, and a second side. It should be understood that the first end and the second end are two opposite ends of the first carrying portion 122. For example, the first end is an end of the first carrying portion 122 that is near the base 110, and the second end is an end of the first carrying portion 122 that is near the second carrier 130. A direction from the first end to the second end or a direction from the second end to the first end may be equivalent to the length direction of the sliding shaft 112. The first side and the second side are two opposite sides of the first carrying portion 122. The first side and the second side may be equivalent to two sides of the first carrying portion 122 relative to the sliding shaft 112.

Based on the foregoing definition of the first carrying portion 122, for example, the first extending portion 124 is located on the first side of the first carrying portion 122, and an extending direction of the first extending portion 124 is the direction from the second end to the first end. However, because location detection by the second sensing element 148 and location detection by the first sensing element 144 are independent of each other, the second extending portion 126 may be located on the first side of the first carrying portion 122, or the second extending portion 126 may be located on the second side of the first carrying portion 122. However, it should be understood that, contrary to that of the first extending portion 124, an extending direction of the second extending portion 126 is the direction from the first end to the second end. In addition, the first protruding portion 134 of the second carrier 130 and the second extending portion 126 are located on the same side, so that the second sensing element 148 can sense the second positioning element 146.

Still referring to FIG. 2 to FIG. 5 and FIG. 7, in some embodiments, to reduce a possibility that the first protruding portion 134 deviates from a length range of the second extending portion 126 in some extreme cases, a first limiting block 128 is disposed at an end of the second extending portion 126 that is away from the first carrying portion 122. The first protruding portion 134 may be limited between the first limiting block 128 and the first carrying portion 122 through cooperation among the first limiting block 128, the second extending portion 126, and the first carrying portion 122, so that a distance between the second sensing element 148 and the second positioning element 146 does not exceed a maximum sensing distance.

It should be understood that, in some extreme cases, for example, the mobile phone that uses the linkage apparatus 100 is dropped from a high altitude or shaken relatively violently, the second carrier 130 and the first carrier 120 may be away from each other, and the second sensing element 148 cannot cooperate with the second positioning element 146 to detect a location. In this embodiment, based on a structure of the first limiting block 128, when the second carrier 130 is about to move away from the first carrier 120, a manner in which the first limiting block 128 abuts against the first protruding portion 134 can ensure that the first protruding portion 134 is located within the length range of the second extending portion 126. Correspondingly, the second sensing element 148 on the first protruding portion 134 can still cooperate with the second positioning element 146 on the second extending portion 126 to detect the location of the second carrier 130 relative to the first carrier 120.

In some embodiments, the first limiting block 128 and the second extending portion 126 may be integrally formed by using a same material, to improve overall strength. For example, materials of both the first limiting block 128 and the second extending portion 126 are high molecular polymers.

In some other embodiments, the first limiting block 128 and the second extending portion 126 may be two independent components, and are fastened by bonding, welding, screwing, or interference fitting, or in another manner.

In some other embodiments, the second carrier includes a second carrying portion and a third extending portion but does not include the first protruding portion. The third extending portion is located at an end of the second carrying portion that faces the first carrier, and extends in a direction towards the first carrier. The second sensing element is disposed on the third extending portion.

Corresponding to a structure of the second carrier, the first carrier has no second extending portion, but includes the first carrying portion, the first extending portion, and a second protruding portion. The second positioning element is disposed on the second protruding portion. In some embodiments, the second protruding portion and the first extending portion are located on a same side of the first carrying portion. In some other embodiments, the second protruding portion and the first extending portion are located on different sides of the first carrying portion. This is not limited.

It should be understood that, a relationship between the third extending portion and the second protruding portion is similar to a relationship between the second extending portion and the first protruding portion in another embodiment. This can also facilitate cooperation between the second sensing element and the second positioning element, to implement a location detection function.

In some embodiments, a corresponding second limiting block may be further disposed at an end of the third extending portion that is away from the second carrying portion, to limit the second protruding portion between the second limiting block and the second carrying portion. Similar to the first limiting block in another embodiment, when the second carrier is about to move away from the first carrier, a manner in which the second limiting block abuts against the second protruding portion can ensure that the second protruding portion is located within a length range of the third extending portion. Correspondingly, the second sensing element on the second protruding portion can still cooperate with the second positioning element on the third extending portion to detect the location of the second carrier relative to the first carrier.

With reference to FIG. 2 to FIG. 6, in some embodiments, to improve overall strength of the first carrier 120, the first carrying portion 122, the first extending portion 124, and the second extending portion 126 may be an integrally formed carrier structure. In some other embodiments, when the first carrier 120 includes the second protruding portion, the first carrying portion 122, the first extending portion 124, and the second protruding portion may also be integrally formed.

With reference to FIG. 2 to FIG. 5 and FIG. 7, in some embodiments, to improve overall strength of the second carrier 130, the second carrying portion 132 and the first protruding portion 134 may be an integrally formed carrier structure. In some other embodiments, when the second carrier 130 includes the second carrying portion 132 and the third extending portion, the second carrying portion 132 and the third extending portion may also be integrally formed.

In some embodiments, both the first positioning element 142 and the second positioning element 146 are magnets. For example, both the first positioning element 142 and the second positioning element 146 are strip-shaped magnets, to help cooperate with a corresponding sensing element to implement location detection. Correspondingly, both the first sensing element 144 and the second sensing element 148 are Hall sensors. The Hall sensors can detect a location by sensing a relative change of a magnetic field.

In some other embodiments, both the first positioning element 142 and the second positioning element 146 are Hall sensors. Based on this, the first sensing signal is generated by the first positioning element 142, and the second sensing signal is generated by the second positioning element 146. Correspondingly, both the first sensing element 144 and the second sensing element 148 are magnets. For example, both the first sensing element 144 and the second sensing element 148 are strip-shaped magnets, to help cooperate with a corresponding positioning element to implement location detection.

In some other embodiments, the two positioning elements may also be different, and one is a magnet and the other is a Hall sensor. Correspondingly, one of the two corresponding sensing elements is a Hall sensor and the other is a magnet, to respectively cooperate with the two positioning elements.

In some embodiments, to drive the first carrier 120 to move, a first drive coil may be disposed on the first carrier 120, and a first drive magnet may be correspondingly disposed on the base 110. The first drive coil and the first drive magnet form a first voice coil actuator. Based on this, the first voice coil actuator can drive the first carrier 120 to move, to change a relative location of the first lens assembly. Similarly, a second drive coil may be disposed on the second carrier 130, and a second drive magnet may be correspondingly disposed on the base 110. The second drive coil and the second drive magnet form a second voice coil actuator. Based on this, the second voice coil actuator can drive the second carrier 130 to move, to change a relative location of the second lens assembly.

Figure 8:
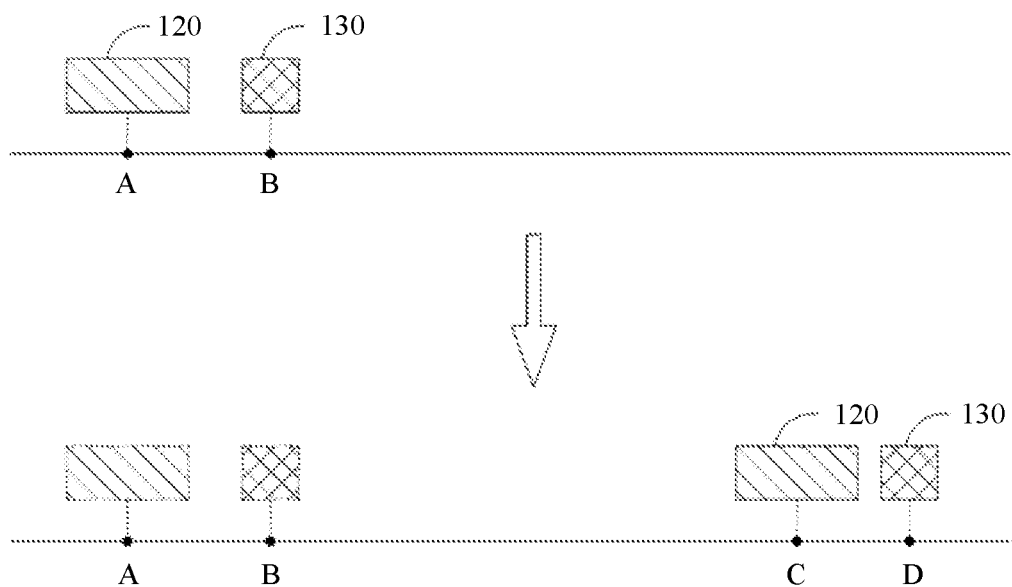
FIG. 8 is a schematic diagram of a relative movement between a first carrier and a second carrier according to an embodiment of this application.

FIG. 8 is a schematic diagram of relative movements of a first carrier and a second carrier. With reference to FIG. 8, in some embodiments, similar to the foregoing example, the first carrier 120 is in a location A, and the second carrier 130 is in a location B. Now, the first carrier 120 needs to move to a location C, and the second carrier 130 needs to move to a location D to complete zooming and focusing at a power of 3×. Based on the linkage apparatus provided in this embodiment of this application, the movement of the first carrier 120 and the movement of the second carrier 130 are associated. When the first carrier 120 moves from the location A to the location C, the relative location relationship between the second carrier 130 and the first carrier 120 changes. This change is obtained through cooperation between the second sensing element and the second positioning element. Therefore, the second carrier 130 can quickly respond to the movement of the first carrier 120 to synchronously move from the location B to the location D. Further, through cooperation between the second sensing element and the second positioning element, the second carrier 130 cooperates with a related control circuit and/or control chip to detect the relative location relationship between the second carrier 130 and the first carrier 120 again, thereby forming a closed-loop detection system. Relative location feedback between the second carrier 130 and the first carrier 120 is more precise based on a plurality of times of closed-loop detection. This can drive the first carrier 120 to precisely move to the location C, and drive the second carrier 130 to precisely move to the location D, thereby implementing zooming and focusing at a power of 3×.

With reference to all of FIG. 1 to FIG. 8, in some embodiments, when the linkage apparatus 100 is applied to the camera module, the camera module further includes some structures configured to capture image information. For example, the camera module further includes an image sensor 1300, and the image sensor 1300 is disposed on a side of the second lens assembly 1200 and away from the first lens assembly 1100, to capture related image information.

In some other embodiments, the camera module may further include some other necessary or unnecessary structures. For example, the camera module further includes a reflector, and the reflector can change an angle of incidence of external light. Therefore, when the camera module is applied to the mobile phone, the linkage apparatus 100 may be disposed along a length direction or a width direction of the mobile phone, to have long zooming and focusing strokes. Based on this, photographing effect of the mobile phone can be correspondingly improved, and user experience of the mobile phone can be improved.

The foregoing descriptions are merely specific implementations of this application. It should be noted that a person of ordinary skill in the art may make several improvements or polishing without departing from the principle of this application and the improvements or polishing shall fall within the protection scope of this application.

What is claimed is:

1. A linkage apparatus, wherein the linkage apparatus is used in a camera module with continuous zooming, and the linkage apparatus comprises:

a base;

a first carrier;
a second carrier, wherein the first carrier and the second carrier are slidably connected to the base;
a first positioning element disposed on the base;
a first sensing element;
a second positioning element, wherein the first sensing element and the second positioning element are disposed on the first carrier; and
a second sensing element is disposed on the second carrier,
wherein the first sensing element is disposed opposite to the first positioning element, to detect a location of the first carrier relative to the base; and
the second sensing element is disposed opposite to the second positioning element, to detect a location of the second carrier relative to the first carrier.

2. The linkage apparatus according to claim 1, wherein the first carrier comprises a first carrying portion and a first extending portion, the first extending portion is located at an end of the first carrying portion that faces the base, and the first sensing element is disposed on the first extending portion.

3. The linkage apparatus according to claim 2, wherein the first carrier further comprises a second extending portion; and
the second extending portion is located at an end of the first carrying portion that faces the second carrier, and the second positioning element is disposed on the second extending portion.

4. The linkage apparatus according to claim 3, wherein the second carrier comprises a second carrying portion and a first protruding portion, the first protruding portion is located on a side of the second carrying portion, and the second sensing element is disposed on the first protruding portion.

5. The linkage apparatus according to claim 4, wherein a first limiting block is disposed at an end of the second extending portion that is away from the first carrying portion, and the first protruding portion is located between the first limiting block and the first carrying portion.

6. The linkage apparatus according to claim 4, wherein the first carrier further comprises a second protruding portion, the second protruding portion is located on a side of the first carrying portion, and the second positioning element is disposed on the second protruding portion.

7. The linkage apparatus according to claim 6, wherein the second carrier comprises a second carrying portion and a third extending portion, the third extending portion is located at an end of the second carrying portion that faces the first carrier, and the second sensing element is disposed on the third extending portion.

8. The linkage apparatus according to claim 7, wherein a second limiting block is disposed at an end of the third extending portion that is away from the second carrying portion, and the second protruding portion is located between the second limiting block and the second carrying portion.

9. The linkage apparatus according to claim 1, wherein the first sensing element is configured to generate a first sensing signal, and the first sensing signal comprises location information of the first carrier relative to the base.

10. The linkage apparatus according to claim 1, wherein the second sensing element is configured to generate a second sensing signal, and the second sensing signal comprises location information of the second carrier relative to the first carrier.

11. The linkage apparatus according to claim 1, wherein the first carrier is configured to carry a first lens assembly for implementing zooming, and the second carrier is configured to carry a second lens assembly for implementing focusing.

12. The linkage apparatus according to claim 11, wherein when the linkage apparatus is configured such that, the first lens assembly moves first, and the second lens assembly moves by following the first lens assembly; and
after the first lens assembly and the second lens assembly move to predetermined locations, zooming is first implemented by adjusting the first lens assembly, and then focusing is implemented by adjusting the second lens assembly.

13. A camera module, comprising a first lens assembly, a second lens assembly, and a linkage apparatus, wherein
the linkage apparatus is used in a camera module with continuous zooming, and the linkage apparatus comprises
a base;
a first carrier;
a second carrier, wherein the first carrier and the second carrier are slidably connected to the base;
a first positioning element disposed on the base;
a first sensing element disposed on the first carrier and opposite the first positioning element;
a second positioning element disposed on the first carrier;
a second sensing element disposed on the second carrier,
wherein the first sensing element is disposed opposite to the first positioning element, to detect a location of the first carrier relative to the base; and
the second sensing element is disposed opposite to the second positioning element, to detect a location of the second carrier relative to the first carrier;
the first lens assembly is disposed on the first carrier, and the second lens assembly is disposed on the second carrier.

14. The camera module according to claim 13, wherein the camera module further comprises a control circuit; and
the control circuit is configured to correspondingly control a movement of the first carrier based on a first sensing signal of the first sensing element or the first positioning element.

15. The camera module according to claim 14, wherein the control circuit is further configured to correspondingly control a movement of the second carrier based on the first sensing signal and a second sensing signal of the second sensing element; or
the control circuit is further configured to correspondingly control a movement of the second carrier based on the first sensing signal and a second sensing signal of the second positioning element.

16. The camera module according to claim 13, wherein when the camera module works, the first lens assembly moves first, and the second lens assembly moves by following the first lens assembly; and
after the first lens assembly and the second lens assembly move to predetermined locations, zooming is first implemented by adjusting the first lens assembly, and then focusing is implemented by adjusting the second lens assembly.

17. An electronic device, comprising a camera module;
wherein the camera module comprises a first lens assembly, a second lens assembly, and a linkage apparatus, wherein
the linkage apparatus is used in a camera module with continuous zooming, and the linage apparatus comprises:
a base;
a first carrier;

a second carrier, wherein the first carrier and the second carrier are slidably connected to the base;
a first positioning element disposed on the base;
a first sensing element;
a second positioning element, wherein the first sensing element and the second positioning element are disposed on the first carrier;
a second sensing element disposed on the second carrier,
wherein the first sensing element is disposed opposite to the first positioning element, to detect a location of the first carrier relative to the base; and
the second sensing element is disposed opposite to the second positioning element, to detect a location of the second carrier relative to the first carrier;
the first lens assembly is disposed on the first carrier, and the second lens assembly is disposed on the second carrier.

18. The electronic device according to claim 17, wherein the first carrier comprises a first carrying portion and a first extending portion, the first extending portion is located at an end of the first carrying portion that faces the base, and the first sensing element is disposed on the first extending portion.

19. The electronic device according to claim 18, wherein the first carrier further comprises a second extending portion; and
the second extending portion is located at an end of the first carrying portion that faces the second carrier, and the second positioning element is disposed on the second extending portion.

20. The electronic device according to claim 19, wherein the second carrier comprises a second carrying portion and a first protruding portion, the first protruding portion is located on a side of the second carrying portion, and the second sensing element is disposed on the first protruding portion.

* * * * *